Sept. 30, 1941.  W. H. BASELT  2,257,587
BRAKE ARRANGEMENT
Filed Oct. 21, 1939   3 Sheets—Sheet 1
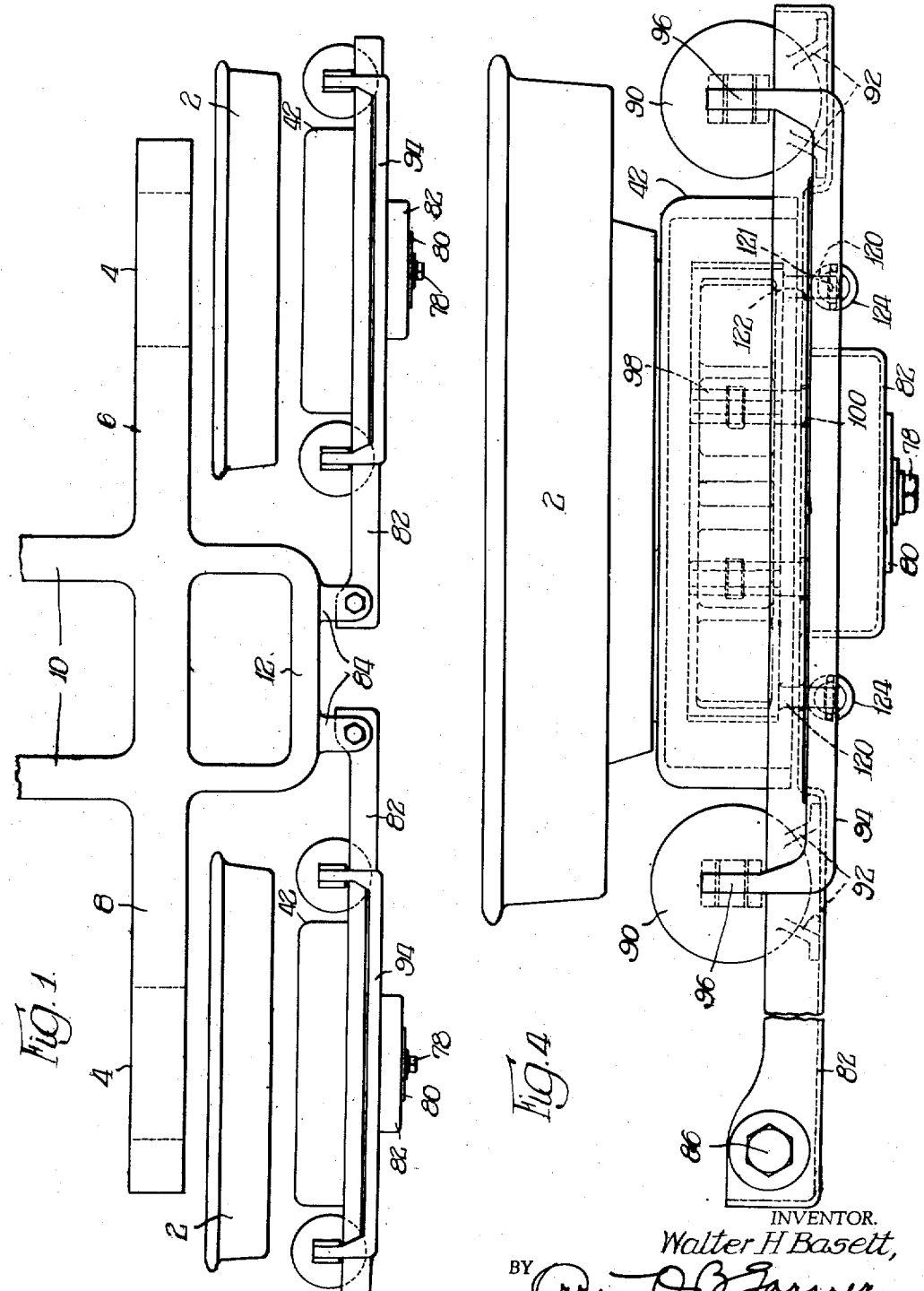
INVENTOR.
Walter H Baselt,
BY
ATTORNEY.

Sept. 30, 1941.  W. H. BASELT  2,257,587
BRAKE ARRANGEMENT
Filed Oct. 21, 1939  3 Sheets-Sheet 2
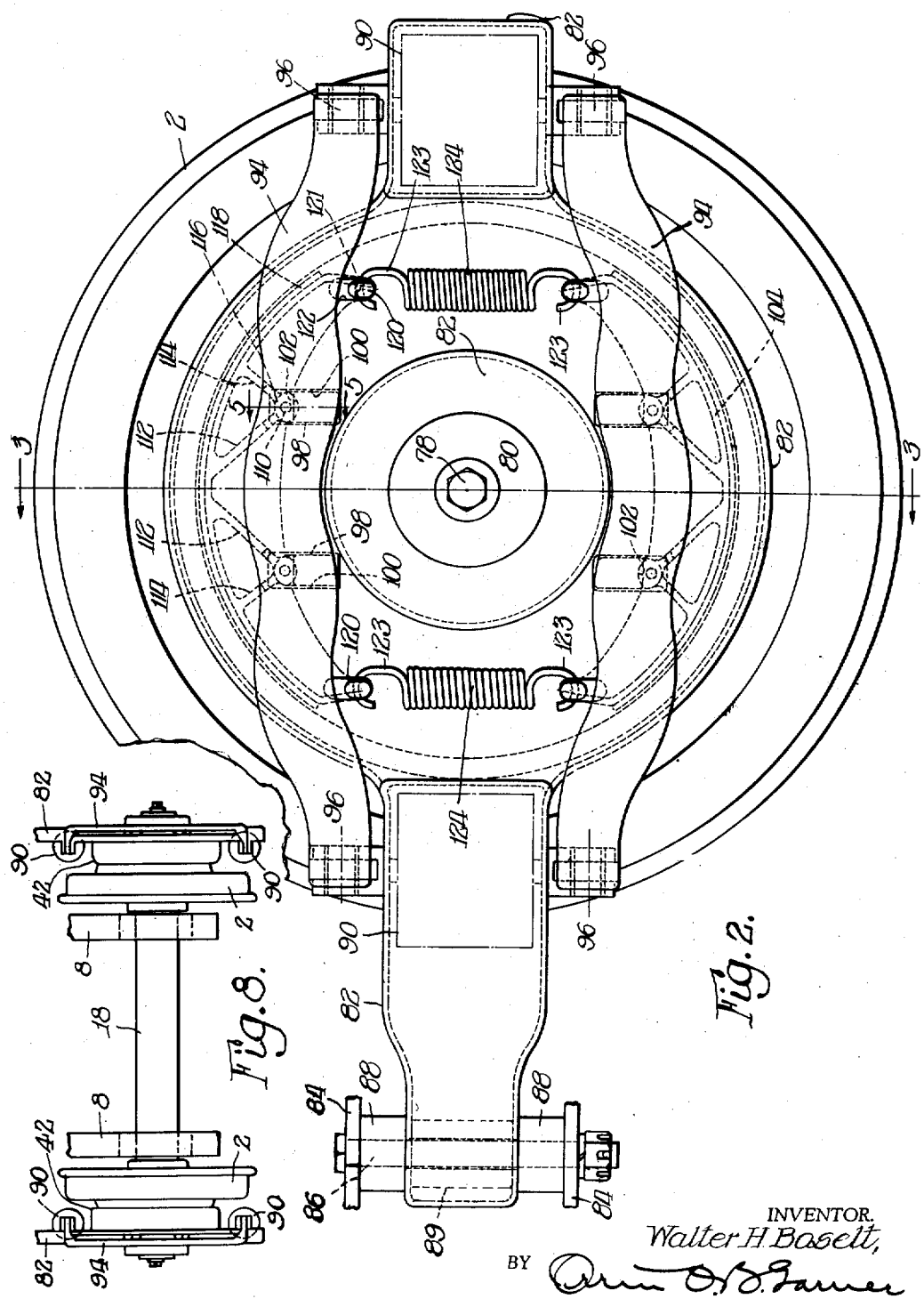
INVENTOR.
Walter H Baselt,
BY
ATTORNEY.

Sept. 30, 1941.   W. H. BASELT   2,257,587
BRAKE ARRANGEMENT
Filed Oct. 21, 1939   3 Sheets-Sheet 3
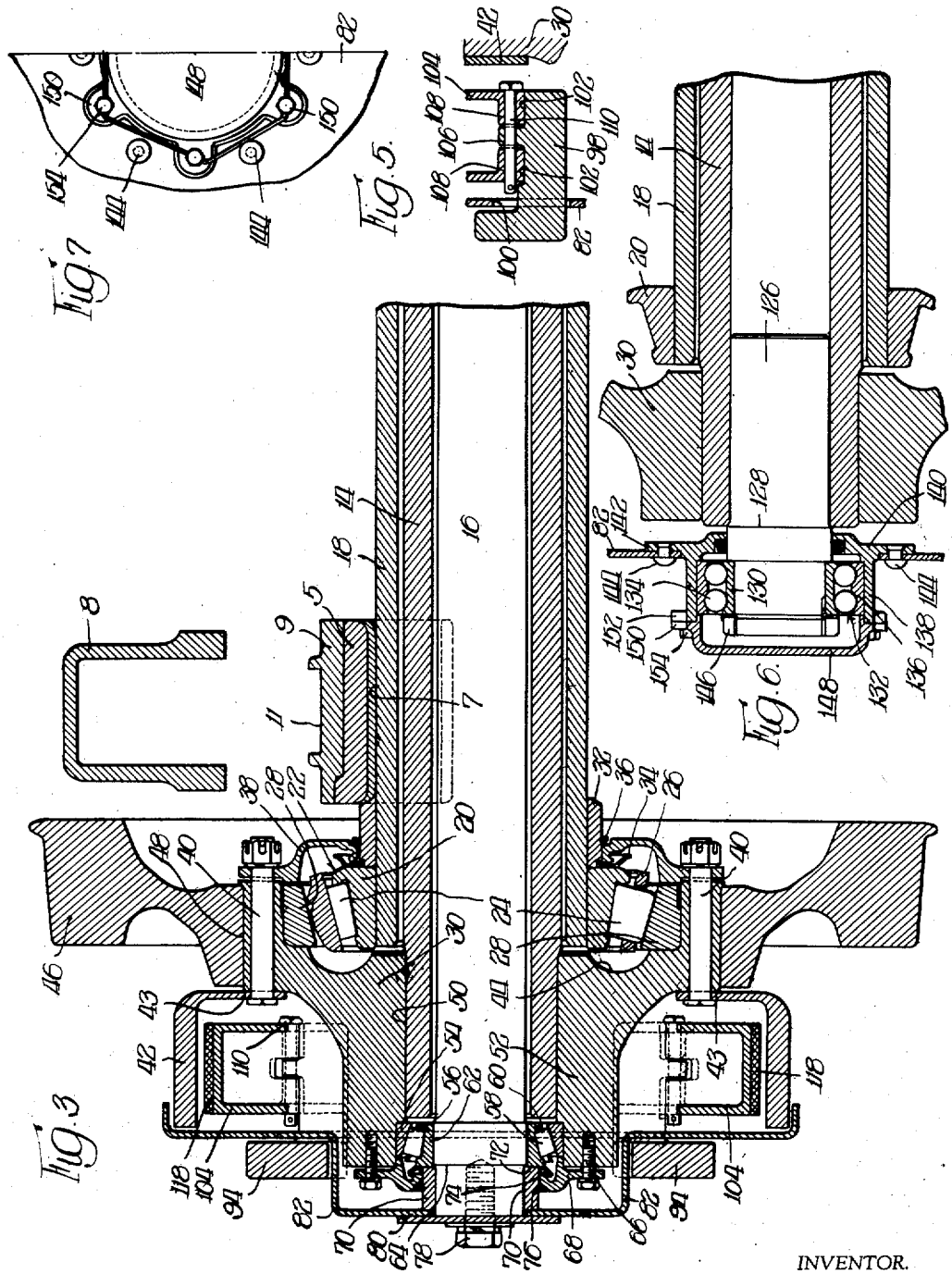
INVENTOR.
Walter H. Baselt,
BY
ATTORNEY.

Patented Sept. 30, 1941

2,257,587

UNITED STATES PATENT OFFICE 2,257,587

BRAKE ARRANGEMENT

Walter H. Baselt, Chicago, Ill., assignor to American Steel Foundries, Chicago, Ill., a corporation of New Jersey Application October 21, 1939, Serial No. 300,505

24 Claims. (Cl. 188—153)

My invention relates to vehicle brakes and more particularly to an internal shoe drum brake which is adapted for use on a railway car.

An object of my invention is to provide an internal shoe drum brake which may be applied to a wheel and axle assembly having an inboard journal box.

Another object of my invention is to provide an internal shoe drum brake which may be operated by power means consisting of double acting air cylinders.

My invention comprehends such a braking arrangement as that above described wherein a torque arm is supported adjacent one end of a wheel and axle assembly and connected to a frame member at the other end wherein said double acting power means are supported from the torque arm at opposite sides of the wheel and axle assembly.

A different object of my invention is such an arrangement as that above described which is suitable for use on one or more wheel and axle assemblies of a truck in conjunction with conventional shoe brakes or without them.

Another object of my invention is a drum brake including the features already mentioned wherein the parts will be accessible for inspection or replacement of parts as required.

Another object of my invention is to adapt an internal shoe drum brake to a railway wheel and axle assembly having means for overcoming objectionable "servo" action.

A still further object of my invention is to adapt a brake of the internal shoe drum type to a wheel and axle assembly having a plurality of axles.

Referring to the drawings, Figure 1 is a top plan view of a truck structure showing my invention, only one-half of said structure being shown inasmuch as the arrangement of the other half is similar;

Figure 2 is a fragmentary side elevation of one of the wheel and axle assemblies shown in Figure 1;

Figure 3 is a sectional view taken along the vertical plane bisecting the wheel and axle assembly shown in Figure 2 as indicated by the line 3—3 of Figure 2;

Figure 4 is a fragmentary top plan view of the wheel and axle assembly shown in Figure 2;

Figure 5 is a sectional view taken through the brake mechanism and substantially in the transverse plane indicated by the line 5—5 of Figure 2;

Figure 6 is a fragmentary view in a plane corresponding to that shown in Figure 3 and illustrating a modification of my invention; and Figure 7 is a fragmentary end view taken from the left of Figure 6.

Figure 8 is a fragmentary top plan view of a wheel and axle assembly showing my novel braking means at opposite ends of the axle.

Describing my invention in greater detail and referring particularly to the modification shown in Figures 1 to 5, the wheel and axle assemblies 2, 2 support through the usual inboard journal connections as at 4, 4 the truck frame generally indicated at 6 comprising a side member 8, spaced transoms 10, 10 formed integrally therewith, and outwardly of the side member 8 the U-shaped bracket 12 integrally formed therewith. The journal connection at 4 may comprise an antifriction bearer or brass member 5 (Figure 3) seated as at 7 upon the axle 18 and affording a means of support for a journal member 9 having a seat as at 11 for a supported frame member.

Each wheel and axle assembly 2 comprises a rotating axle 14 (Figure 3) encasing an inner non-rotating axle 16 and having an outer non-rotating axle 18 sleeved thereover. Adjacent the outer end of the outer non-rotating axle may be press fitted thereon the inner race or cone 20 of the antifriction bearing 22. The antifriction bearing 22 comprises rollers 24, 24 held in normal spaced relationship by the cage 26 and the outer race or cup 28 press fitted within the wheel hub 30. Abutting the inner face of the inner race 20 may be the shrink collar 32 suporting adjacent said inner race 20 the oil deflector 34 and having the baffle ring 36. The closure plate 38 for the lubricant cavity 44 may be secured to the wheel hub 30 by means of bolts 40, 40, said bolts also serving to retain the brake drum 42 in position against the outer face of the wheel hub as at 43, 43.

The wheel 46 may be press fitted on the wheel hub 30 as at 48 and said wheel hub may be press fitted on the rotating axle 14 as at 50. The wheel hub 30 may be formed with an outwardly projecting annular flange 52 receiving adjacent its outer end the outer race or cup 54 of the antifriction bearing 56, said cup having a press fit within the hub 30. The antifriction bearing 56 comprises rollers 58, 58 held in normal spaced relationship by the cage 60 and the inner race or cone 62 pressed on the shoulder 64 of the inner non-rotating axle 16. The closure plate 68 is secured to the hub 30 as by bolts 66, 66. Outwardly of the shoulder 64 the collar 70 is shrunk on the end of the axle 16 in abutment as at 72 with the inner race of the bearing 66, thus positioning said bearing. The said shrink collar supports the oil deflector 74 and the baffle ring 76.

On the outer end of the non-rotating axle 16 the retaining disk 80, secured in position by the bolt 78, acts as a retainer for the torque arm 82 which is thus supported on the axle 16 in abutment with the shrink collar 70. The opposite end of the torque arm is resiliently supported from the bracket 84 (Figure 2) on the truck frame by means of a bolt 86 and rubber cushions 88, 88. A filler 89 may be provided within the outer end of the said torque arm for strengthening said connection.

The torque arm 82 may be of channel-like structure and adjacent the wheel it may take a circular form to afford a cover plate for the brake assembly as best seen from a consideration of Figures 2 and 3. Adjacent opposite sides of the wheel said torque arm may support from brackets 92, 92 formed integrally therewith, the double acting cylinders 90, 90 serving as power means.

Top and bottom cylinder levers 94, 94 may be connected as at 96, 96 to the pistons of the cylinders 90, 90. At intermediate points each lever 94 is afforded spaced inwardly directed brackets 98, 98 (Figure 5) projecting through guide slots 100, 100 formed in the torque arm 82, said brackets being arcuately relieved as at 102, 102 to afford seats for brake shoes 104, 104. The method of connecting the brake shoes to the lever arm is best shown in Figure 5 wherein it may be seen that the bracket 98 is afforded a lug 106 intermediate the seats 102, 102 on opposite sides of which may be seated the lugs 108, 108 of the brake shoe, said shoe being secured in position by the pin 110 extending through aligned openings in said lugs. Each brake shoe 104 may be of arcuate shape (Figure 2) having reinforcing ribs 112, 112 and 114, 114 merging as at 116 with said lugs 108, 108. The said brake shoes may be placed above and below the axis of the wheel and axle assembly and are faced with brake lining 118. At opposite ends each brake shoe may be formed with outwardly projecting arms 120, 120 extending through guide slots 122, 122 in the torque arm 82. The arms 120, 120 may be perforated adjacent their outer ends as at 121, 121 to receive the hooks 123, 123 formed on the extremities of the release springs 124, 124. The said springs connect the adjacent ends of the brake shoes and serve to retain them in their normal released position. The slots 122, 122 are formed for the purpose of guiding the brake shoes during braking action to prevent undesirable "servo" action.

In the modification shown in Figures 6 and 7 the inner non-rotating axle 16 is replaced by a stub shaft 126 pressed into the rotating axle 14. The said stub shaft may be formed with a shoulder 128 for positioning against the outer end of the rotating axle 14, and outwardly of said shoulder may be press fitted the inner race or cup 130 of the antifriction bearing 132. The antifriction bearing 132 comprises the ball bearings 134, 134 and the outer race 136 press fitted in the outwardly directed annular flange 138 of the closure plate 140. The said closure plate may have a radially projecting flange 142 serving to support the torque arm 82 which may be riveted thereto as at 144, 144. The inner race 130 is retained by the lock nut 146 threaded on the outer end of the stub shaft 126. The cover plate 148 may be formed with the spaced lugs 150, 150 in alignment with the spaced lugs 152, 152 on the closure plate 140 and may be secured to said closure plate by the bolt and nut assemblies 154, 154. This modification affords some simplification and decrease in weight as compared with that first described. It will also be readily apparent to those skilled in the art that the axle 14 and the shaft 126 may be integral if for any reason it may be found desirable.

In operation, actuation of the double acting cylinders 90, 90 urge the levers 94, 94 apart, thus bringing the brake shoes 104, 104 into frictional engagement with the brake drum 42. As the power is removed the release springs 124, 124 return the brake shoes and brake levers to their normal positions. It may be noted that the brake drum 42 may be formed with a heavy section of metal opposing the brake shoes so as to provide longer wear (Figure 3).

It is to be understood that I do not wish to be limited by the exact embodiments of the device shown which are merely by way of illustration and not limitation as various and other forms of the device will of course be apparent to those skilled in the art without departing from the spirit of the invention or the scope of the claims.

I claim:

1. In a vehicle, a frame, a supporting wheel and axle assembly including inner and outer non-rotating axles, a rotating axle therebetween, a wheel fitted on said rotating axle, bearings between said wheel and outer axle, braking means comprising a drum supported from said rotating axle, shoes supported from said inner non-rotating axle, and operable means for bringing said shoes and drum into frictional engagement, said operable means including a torque arm carried on said inner non-rotating axle and connected to said frame, cylinders supported from said torque arm at opposite sides of said drum, cylinder levers connected between said cylinders, and means on said levers for urging said shoes into engagement with said drum.

2. In a vehicle, a truck frame, a supporting wheel and axle assembly including an inner non-rotating axle, a rotating axle with a wheel fixed thereon, a drum secured to the outboard face of said wheel, and braking means comprising a torque arm connected to said frame and affording a cover for said drum, double-acting cylinders supported on said arm at opposite sides of said drum, cylinder levers connected at corresponding ends of said cylinders, and brake shoes mounted on said levers for engagement with said drum.

3. In a vehicle, a frame, a supporting wheel and axle assembly comprising an outer axle sleeved over an inner axle, a shaft fitted in said inner axle, a wheel fitted on said inner axle, a brake drum supported from said inner axle, an antifriction bearing mounted on said shaft, and braking means comprising a torque arm connected at one end to said frame and supported at its opposite end on said shaft, cylinders supported on said arm at opposite sides of said drum, cylinder levers connecting corresponding ends of said cylinders, and brake shoes supported on said levers for engagement with said drum.

4. In a car truck, a truck frame, a supporting wheel and axle assembly comprising a non-rotating axle, a rotating axle having a wheel fitted thereon, braking means comprising a drum supported from said rotating axle, a torque arm supported from said non-rotating axle and connected at one end to said frame, spaced cylinders on said torque arm, cylinder levers connecting corresponding ends of said cylinders, and brake shoes supported from said levers for engagement with said drum.

5. In a car truck, a truck frame, a supporting wheel and axle assembly including an inner axle, an outer axle, an intermediate axle with a wheel fitted thereon, braking means comprising a drum supported from said wheel, a torque arm supported from said inner axle and connected at one end to said frame, double-acting cylinders supported at spaced points on said torque arm, cylinder levers connecting corresponding ends of said cylinders, and brake shoes mounted on said levers for engagement with said drum.

6. In a vehicle, a truck frame, a supporting wheel and axle assembly including an inner non-rotating axle, a rotating axle, a wheel fitted on said rotating axle, braking means comprising a drum supported from said rotating axle, a torque arm supported on said non-rotating axle and connected at one end to said frame, double-acting cylinders supported at spaced points on said torque arm, cylinder levers connecting corresponding ends of said cylinders, brake shoes mounted on said levers for engagement with said drum, and release means connected between said shoes at opposite sides of the drum.

7. In a vehicle, a frame, a supporting wheel and axle assembly comprising an inner axle, an outer axle, a rotating axle therebetween, a wheel on said rotating axle, an anti-friction bearing between said wheel and said outer axle, a brake drum carried on said wheel, a torque arm supported around said inner axle, cylinders supported on said torque arm at opposite sides of said drum, cylinder levers connecting corresponding ends of said cylinders, and brake shoes mounted on said levers for engagement with said drum.

8. In a car truck, a frame, a supporting wheel and axle assembly comprising inner and outer non-rotating axles, an intermediate axle with a wheel thereon, bearings between said non-rotating axles and said wheel, a brake drum supported on the outboard face of said wheel, and braking means comprising a torque arm supported on said inner axle and connected to said frame, cylinders supported on said arm at opposite sides of said drum, cylinder levers connecting corresponding ends of said cylinders, and brake shoes supported from said levers for engagement with said drum.

9. In a railway car truck, a frame, spaced supporting wheel and axle assemblies, each assembly comprising inner and outer non-rotating axles, an intermediate rotating axle with wheels thereon, bearings between said wheels and said non-rotating axles, and braking means for each wheel comprising a drum mounted on the outboard face of the wheel, a torque arm supported from the inner axle and connected to said frame, cylinders supported at spaced points on said torque arm, cylinder levers connected between corresponding ends of said cylinders, and braking means supported on said levers for engagement with said drum.

10. In a railway car truck, a frame, spaced supporting wheel and axle assemblies, each assembly comprising inner and outer non-rotating axles, an intermediate rotating axle with wheels thereon, bearings between said wheels and said non-rotating axles, and braking means for each wheel comprising a drum mounted on the outboard face of the wheel, a torque arm supported from the inner axle and connected to said frame, cylinders supported at spaced points on said torque arm, cylinder levers connected between corresponding ends of said cylinders, braking means supported on said levers for engagement with said drum, and release springs connected between the braking means at opposite sides of the drum.

11. In a railway car truck, a frame, a supporting wheel and axle assembly comprising an inner non-rotating axle, a wheel carrying axle sleeved around said inner axle, and braking means for said wheel comprising a drum on said wheel, a torque arm supported on said inner axle and connected to said frame, spaced power means supported on said torque arm, cylinder levers connected between corresponding ends of said power means, and brake shoes carried on said levers for engagement with said drum.

12. In a railway car truck, a frame, a supporting wheel and axle assembly comprising an inner non-rotating axle, a wheel carrying axle sleeved around said inner axle, and braking means for said wheel comprising a drum on said wheel, a torque arm supported on said inner axle and connected to said frame, spaced power means supported on said torque arm, cylinder levers connected between corresponding ends of said power means, brake shoes carried on said levers for engagement with said drum, and release means connected between the brake shoes at opposite sides of the drum.

13. In a railway car truck, a frame, a supporting wheel and axle assembly comprising an inner non-rotating axle, a wheel carrying axle sleeved around said inner axle, and braking means for said wheel comprising a drum on said wheel, a torque arm supported on said inner axle and connected to said frame, spaced power means supported on said torque arm, cylinder levers connected between corresponding ends of said power means, and brake shoes carried on said levers for engagement with said drum, said torque arm comprising a circular portion affording a cover for said drum.

14. In a railway car truck, a frame, a supporting wheel and axle assembly comprising an inner non-rotating axle, a wheel carrying axle sleeved around said inner axle, and braking means for said wheel comprising a drum on said wheel, a torque arm supported on said inner axle and connected to said frame, spaced power means supported on said torque arm, cylinder levers connected between corresponding ends of said power means, brake shoes carried on said levers for engagement with said drum, and release means connected between the brake shoes at opposite sides of the drum, said torque arm comprising a circular portion affording a cover for said drum.

15. In a railway car truck, a frame, a supporting wheel and axle assembly comprising a non-rotating axle, a rotating axle carrying a wheel, bearings between said non-rotating axle and said wheel, and braking means in the form of a drum fixed to said wheel, a torque arm supported on said non-rotating axle and connected to said frame, said torque arm affording a cover for said drum, spaced power means mounted on said torque arm at opposite sides of said drum, cylinder levers connecting corresponding ends of said power means, and brake shoes supported on said levers for engagement with said drum.

16. In a railway car truck, a frame, a supporting wheel and axle assembly comprising a non-rotating axle, a rotating axle carrying a wheel, bearings between said wheel and non-rotating axle, and braking means in the form of a drum fixed to said wheel, a torque arm supported on said non-rotating axle and connected to said frame, said torque arm affording a cover for said drum, spaced power means mounted on said torque arm at opposite sides of said drum, cylinder levers connecting corresponding ends of said power means, brake shoes supported on said levers for engagement with said drum, and guide means on said torque arm for said shoes.

17. In a railway car truck, a frame, a supporting wheel and axle assembly comprising a non-rotating axle, a rotating axle carrying a wheel, bearings between said wheel and non-rotating axle, and braking means in the form of a drum fixed to said wheel, a torque arm supported on said non-rotating axle and connected to said frame, said torque arm affording a cover for said drum, spaced power means mounted on said torque arm at opposite sides of said drum, cylinder levers connecting corresponding ends of said power means, brake shoes supported on said levers for engagement with said drum, guide means on said torque arm for said shoes, and release means connected between said shoes at opposite sides of said drum.

18. In a railway car truck, a frame, a supporting wheel and axle assembly including an inner axle and a wheel supporting axle, a brake drum on said wheel, bearings between said wheel and non-rotating axle, and braking means comprising a torque arm having an annular portion affording a cover for said drum, cylinders supported on said torque arm at opposite sides of said drum, levers connecting corresponding ends of said cylinders, and brake shoes carried on said levers for braking engagement with said drum.

19. In a railway car truck, a frame, a supporting wheel and axle assembly including an inner axle and a wheel supporting axle, bearings between said wheel and non-rotating axle, a brake drum on said wheel, and braking means comprising a torque arm having an annular portion affording a cover for said drum, cylinders supported on said torque arm at opposite sides of said drum, levers connecting corresponding ends of said cylinders at opposite sides of the axle, brake shoes supported on said levers for engagement with opposite sides of said drum, and guide means on said torque arm for said levers.

20. In a railway car truck, a frame, a supporting wheel and axle assembly including an inner axle and a wheel supporting axle, a brake drum on said wheel, bearings between said wheel and non-rotating axle, and braking means comprising a torque arm having an annular portion affording a cover for said drum, cylinders supported on said torque arm at opposite sides of said drum, levers connecting corresponding ends of said cylinders at opposite sides of the axle, brake shoes supported on said levers for engagement with opposite sides of said drum, and release means connected between said shoes.

21. In a railway car truck, a frame, a supporting wheel and axle assembly including an inner axle and a wheel supporting axle, a brake drum on said wheel, bearings between said wheel and non-rotating axle, and braking means comprising a torque arm having an annular portion affording a cover for said drum, cylinders supported on said torque arm at opposite sides of said drum, levers connecting corresponding ends of said cylinders at opposite sides of the axle, brake shoes supported on said levers for engagement with opposite sides of said drum, release means connected between said shoes, and guide means on said torque arm for said shoes.

22. In a railway car truck, a frame, a supporting wheel and axle assembly comprising an inner non-rotating axle, a rotating axle with a wheel thereon, bearings between said wheel and non-rotating axle, a brake drum supported on said wheel and braking means including a torque arm supported on said inner axle and connected to said frame, power means mounted on said arm at opposite sides of said drum, levers connecting corresponding ends of said power means on opposite sides of the axle, brackets on said levers extending through slots in said arm, and brake shoes supported on said brackets for engagement with said drum.

23. In a railway car truck, a frame, a supporting wheel and axle assembly comprising an inner non-rotating axle, a rotating axle with a wheel thereon, bearings between said wheel and non-rotating axle, a brake drum supported on said wheel, and braking means including a torque arm supported on said inner axle and connected to said frame, power means mounted on said arm at opposite sides of said drum, levers connecting corresponding ends of said power means on opposite sides of the axle, brackets on said levers extending through slots in said arm, brake shoes supported on said brackets for engagement with said drum at opposite sides thereof, and release means connected between the shoes at opposite sides of the drum.

24. In a railway car truck, a frame, a supporting wheel and axle assembly, and braking means for said assembly comprising a drum driven by said wheel, a torque arm supported on said axle and connected to said frame, spaced power means supported on said torque arm, cylinder levers disposed on opposite sides of said axle and connected between corresponding ends of said power means, and brake shoes carried on said levers for engagement with said drum.

WALTER H. BASELT.